United States Patent [19]

Sano et al.

[11] 4,163,725
[45] Aug. 7, 1979

[54] PROCESS FOR PREPARING OF SEMIPERMEABLE MEMBRANES

[75] Inventors: Takezo Sano, Takatsuki; Takatoshi Shimomura, Toyonaka; Masao Sasaki, Osaka; Ichiki Murase, Ibaraki; Manabu Hirakawa, Toyonaka, all of Japan

[73] Assignee: Sumitomo Chemical Company, Limited, Osaka, Japan

[21] Appl. No.: 761,904

[22] Filed: Jan. 24, 1977

[30] Foreign Application Priority Data

Feb. 2, 1976 [JP] Japan ................................. 51-10485

[51] Int. Cl.² ............................ C08J 3/24; C08J 3/28; C08J 7/10
[52] U.S. Cl. ..................................... 210/490; 264/22; 427/40; 204/165; 210/500 M
[58] Field of Search ............. 210/500 M, 23 H, 23 F, 210/22, 321 R; 427/245, 34, 40; 264/22, 49, 41; 55/16; 204/165; 260/2.5 R, 2.5 M

[56] References Cited

U.S. PATENT DOCUMENTS

| 3,309,299 | 3/1967 | Mantell | 204/165 |
|---|---|---|---|
| 3,615,024 | 8/1971 | Michaels | 210/490 |
| 3,639,134 | 2/1972 | Stegmeier et al. | 117/7 |
| 3,775,308 | 11/1973 | Yasuda | 210/23 |
| 3,846,521 | 11/1974 | Osterholtz | 55/16 |
| 3,847,652 | 11/1974 | Fletcher et al. | 117/93 GD |
| 3,992,495 | 11/1976 | Sano et al. | 210/500 M |
| 4,032,440 | 6/1977 | Yasuda | 210/23 H |
| 4,046,843 | 9/1977 | Sano et al. | 210/500 M |

Primary Examiner—Frank A. Spear, Jr.
Assistant Examiner—David R. Sadowski
Attorney, Agent, or Firm—Stevens, Davis, Miller & Mosher

[57] ABSTRACT

A method for the preparation of semipermeable membrane which comprises exposing porous shaped articles of polysulfone to a plasma.

The resulting semipermeable membrane is very useful for separating substances by reverse osmosis or ultrafiltration.

6 Claims, 1 Drawing Figure

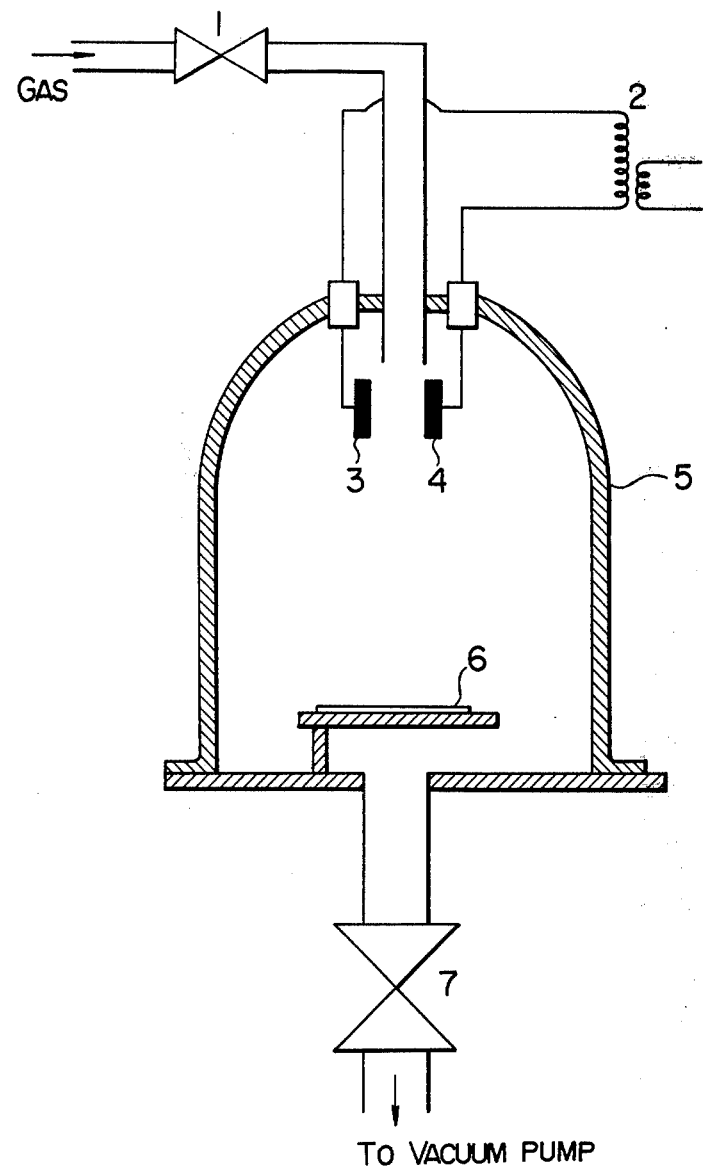
TO VACUUM PUMP

PROCESS FOR PREPARING OF SEMIPERMEABLE MEMBRANES

The present invention relates to a method for the preparation of the semipermeable membrane having extremely excellent thermal and chemical resistances for reverse osmosis or ultrafiltration by exposing the porous membrane of polysulfones to a plasma thereby crosslinking the surface thereof.

The semipermeable membrane now in an industrial production is a cellulose acetate membrane produced according to the method of Loeb and Sourirajan (U.S. Pat. Nos. 3,133,132 and 3,133,137) or a similar method. Although this membrane is very highly permeable to water but not to sodium chloride, it deteriorates in performance owing to the inherent susceptibility of cellulose acetate to hydrolysis. As a result, an ability to remove solutes including sodium chloride becomes poor with the lapse of time and the life of the membrane is limited.

Further, Loeb's method for the preparation of asymmetric membrane having a skin structure requires a high-level technique and severe operation condition. Consequently, this method is only successful in a few cases of synthetic high polymer besides cellulose acetate. This is due to the fact that it is difficult to properly select the casting solvent, additives, composition and temperature of the casting solution, atmosphere wherein evaporation of the solvent is in progress, and temperature of the atmosphere. Therefore, this method may not be said to be widely applicable.

In recent years, on the other hand, attempts have been made about various synthetic high polymers to prepare semipermeable membrane which is superior to cellulose acetate in chemical, mechanical and thermal properties and in water permeability. These attempts are intended to form a skin layer and a supporting layer at the same time by the above described casting process, however, the resulting membrane has no stable performance because selection of proper casting conditions is very difficult.

Polysulfones are thermoplastic resins which are easy to be had and molded, and have excellent chemical, mechanical and thermal stabilities. Reverse osmosis membranes are developed by using a sulfonated polysulfone as a modified polysulfone, but the preparing method is complicated considering a process for sulfonation of the polysulfone.

In order to overcome the difficulties of the aforesaid methods for preparing the membranes and the defects of chemical, mechanical and thermal properties of aforesaid membranes, the inventors have extensively studied particularly to prepare the polysulfone membranes. As the results, the following important facts were surprisingly found: when porous membrane of polysulfones is exposed to a plasma, (1) a very thin, dense crosslinked layer, $1\mu$ or less in thickness, is formed at the surface of the membrane; (2) the exposed membrane has an ability to separate water from the solute when used as semipermeable membrane; and (3) the membrane is much superior to that of cellulose acetate or commercially available synthetic polymers in thermal and chemical resistance.

According to the present invention, it is possible to prepare a polysulfone semipermeable membrane which is free from the defects of the conventional cellulose acetate membrane, namely susceptibility to hydrolysis and deterioration by the action of bacteria, and is usable in severe chemical and thermal conditions, as shown in Examples described below.

An object of the present invention is to provide semipermeable membranes, for use in reverse osmosis and ultrafiltration, having selective permeability of substances and chemical and thermal resistances, and being preservable in a dry state, which may be obtained by exposing porous shaped articles of a polysulfone to a plasma to form a dense cross-linking layer on the surface of said articles.

FIG. 1 is a schematic diagram of a plasma irradiating apparatus for use in the method of the present invention. In the diagram, 1 and 7 are cocks, 2 a neon transformer, 3 and 4 electrodes, 5 a vessel and 6 a sample.

Polysulfones used in the present invention are well known. [For example, Japanese Patent Publication (unexamined) No. 146648/75] Namely, the polysulfones are those which contain —$SO_2$— and aromatic ring as recurring units in the main chain, and preferably, have glass transition temperature of more than 150° C. and following recurring units or derivatives thereof or mixture thereof.

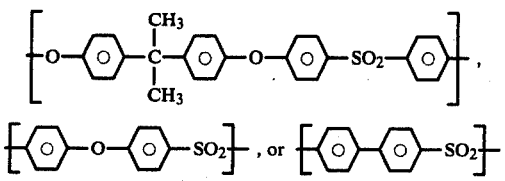

Suitable examples of the polysulfone are those which have following structures.

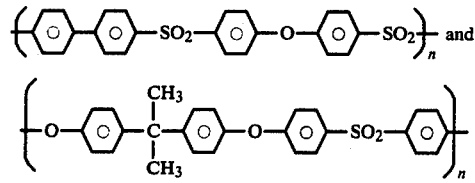

(wherein the n is an integer of 10 to 1000.)

As for commercial polysulfones used in the present invention, for example. Udel ® (manufactured by Union Carbide Corp.), Arylon ® (manufactured by Uniroyal INC.) Astrel ® (manufactured by 3M Corp.), polyether sulfone (manufactured by Imperial Chemical Ind.) and the like are illustrated.

The porous shaped articles to be applied to exposure to plasma have a porosity of 10 to 90%. The porous shaped articles are not particularly limited in the method for the preparation thereof, but particularly preferred ones are porous membranes prepared by the conventional casting process comprising solvent evaporation and gelation. The porous articles may be used in various forms. Specifically, the articles may have a form of sheet or hollow fiber in addition to membrane or may be a composite with other porous supports. The articles are used practically as a module having a suitable form after being exposed to a plasma.

Porous membranes of the polysulfone are prepared by various methods, preferably by following method. First, the polysulfone is dissolved in a solvent so that concentration thereof is 5 to 30% by weight. A kind of the solvent can be properly selected depending upon a kind of the polysulfone. Suitable examples are dimethyl acetoamide, dimethylformamide, dimethylsulfoxide, pyridine, methylene chloride, trichloroethylene, cyclohexanon, chloroform, chlorobenzene, tetrachloroethylene, 1,1,2,2-tetrachloroethane, a mixture thereof, and the like.

The polymer solution obtained is cast on a substrate, for example, glass plate with a doctor knife. The thickness of the cast solution is related to the thickness of semipermeable membrane. Consequently, the thickness of the solution on the substrate is generally controlled so as to form a semipermeable membrane having a thickness of about 100μ. The coated substrate is dipped in a non-solvent immediately after the casting or after the solvent of the solution is evaporated for some time.

In general, a period of time during which the solvent is evaporated is preferably 0 to 60 minutes and the evaporation is preferably carried out at a temperature between 0° C. and the boiling point of the solvent. Thereafter, the coated substrate, from which the solvent may partially be evaporated or may not be evaporated, is dipped in a non-solvent. As the non-solvent, there may be used water or a mixture of water and an organic solvent. The organic solvent used herein is a water-soluble one and preferably the same solvent that is used for the preparation of said polymer solution.

In the preparation of the porous membrane, various operation conditions, for example, polymer concentration, casting temperature, evaporation time and gelation temperature, have, of course, an influence on the performance of the final product, namely plasma-exposed membrane, to some extent, but the conditions are not decisive. The porous membrane thus obtained can be applied to exposure to plasma, if it has a water permeability of 1 to 1,000 gfd (under a pressure of 10 kg/cm$^2$) and a bubbling point [The value of air pressure (kg/cm$^2$) under which the air may be pressed out through the pores of membrane which has been throughly wetted with water.] of more than 1 kg/cm$^2$ in the wet state of the membrane, in other words, if the membrane is free from defects. The present invention is rather intended to regulate the performance of the final product by controlling the plasma exposure conditions. In the exposure to plasma, a dried porous membrane is used in principle.

The plasma in the present invention refers to the one generated by glow discharge, corona discharge or the like. Among them the glow discharge is particularly preferred. For example, the plasma by glow discharge is generated by introducing a gas which is not polymerized to give solid products by plasma technique, preferably an inorganic gas (e.g. hydrogen, helium, argon, nitrogen, oxygen, carbon monoxide, carbon dioxide, ammonia, water) into a vacuum vessel 5 as shown in FIG. 1 through a cock 1 so that the pressure in the vessel becomes 0.01 to 10 Torr, and applying an alternating current or direct current voltage of 0.5 to 50 kV between electrodes 3 and 4 by means of a neon transformer 2. Further, a plasma is produced by generating corona discharge in the atmosphere or in an inert gas with a direct current of 0.1 to 1.3 A at 1 kV. In this case, an industrial production of the semipermeable membrane becomes easier.

The plasma thus generated penetrates into substances to such an extremely low extent that it is very useful for crosslinking polysulfone porous membrane at the surface alone thereof thereby allowing the membrane to be impermeable to a solute.

The separation property of the semipermeable membranes of the present invention is determined by controlling various factors, among which the exposure time and exposure dose are important. By varying these two factors, it is possible to control the degree of crosslinking at the membrane surface and thereby to obtain a membrane having a desired separation property. Usually, the exposure time is 1 to 120 minutes and the exposure dose is 5 to 2500 watt (1 to 5 kV, 5 to 500 mA). These exposure conditions are not general but dependent upon the water permeability and crosslinkability of the polysulfone porous membrane in a wet state.

As described above, the method of the present invention is characterized by crosslinking polysulfone porous membrane in the vicinity alone of the surface thereof by making use of a low degree of the penetration of plasma into substances, thereby producing a very dense layer at the surface. By this novel technique, it becomes easy to produce a crosslinked, dense layer having a thickness of less than 1μ. Consequently, this method is completely free from the difficulty of skin layer-formation which is encountered in the casting process.

The semipermeable membrane of the present invention has a thickness of 20 to 500μ. By electron microscopic observation, it is found that the membrane has the following characteristic, heterogeneous structure: pores of 100 to 1,000 Å in size are present in the layer close to the crosslinked surface layer and the size of the pores increases gradually to 1 to 100μ towards the back surface of the membrane.

On the other hand, one of the features of the present semipermeable membrane is that the membrane is much superior to the conventional cellulose acetate membranes in chemical, mechanical and thermal properties and in an ability to separate substances when used in reverse osmosis and the like.

In other words, the semipermeable membrane of the present invention shows no reduction of performances even on a long-term operation, has a high stability, and is sufficiently usable in the pH range as wide as 1 to 14 and at the highest temperature of 90° C.

Consequently, the plasma-exposed polysulfone semipermeable membrane of the present invention is widely used for separating or concentrating substances by reverse osmosis, ultrafiltration or the like. More specifically, it is used for the preparation of fresh water from sea water, waste water treatment, concentration of fruit juices and the like. Further, the present semipermeable membrane is insoluble in many organic solvents so that it is widely applicable to separation of nonaqueous fluids.

The present invention will be illustrated more specifically with reference to the following examples, which are not however intended to limit the invention thereto.

The solute rejection is defined by the following equation:

$$\text{Solute rejection (\%)} = (1 - \frac{\text{the concentration of solute in permeated solution}}{\text{the concentration of solute in feed solution}}) \times 100$$

EXAMPLE 1

20 Parts by weight of commercial polyarylsulfone (Trade name: Astrel® 360, manufactured by 3M Corp.) was dissolved in a mixed solvent of 25 parts by weight of dimethylformamide and 55 parts by weight of dimethylsulfoxide. The resulting solution was cast on a glass plate kept at 40° C. so that the thickness of the solution became 250μ. After 1 minutes's evaporation, the glass plate was immersed in water at 21° to 22° C. to carry out gelation of the solution.

After 2 hours, the resulting membrane was removed from the glass plate and was tested, as it is, for water permeability under a pressure of 10 kg/cm². As the results, the water flux was 73 gallons/feet² day (gfd). Electron photomicrographs of sectional structure of this membrane show the dense layer of 9μ in thickness on the outside surface and the underlayer containing many pores of 300 Å to 20μ in diameter. Namely, this membrane is asymmetric.

Next, the wet membrane was dried overnight at room temperature. The dry membrane was placed in a vacuum vessel shown in FIG. 1 and a pressure of 0.10 to 0.15 Torr of helium gas was applied in the vessel by controlling cocks 1 and 7. Thereafter, an alternating current voltage of 3.0 kV was applied between electrodes 3 and 4 by means of a neon transformer 2 and the membrane was exposed to the plasma for 90 minutes under such conditions. When the exposed membrane was immersed in dimethylformamide, the insoluble ultrathin membrane of 0.8μ in thickness was left in dimethylformamide.

The exposed membrane was mounted on a continuous reverse osmosis apparatus (effective area of membrane, 13 cm²) usually used in a laboratory and reverse osmosis characteristics were measured by using a saline water containing an amaranth (sodium chloride concentration; 0.55%, molecular weight of the amaranth; 604, the amaranth concentration; 100 ppm)

Experimental Conditions

Pressure: 50 kg/cm²
Temperature of saline water: 21° C.
Feed rate of saline water: 270 ml/min

Experimental results (performance of semipermeable membrane)

Water flux: 4.2 gfd
Salt rejection: 96.3%
Amaranth rejection: 100%

The unexposed, dry membrane was likewise tested. As the results, the water flux was 3.9 gfd and showed no ability to remove sodium chloride and the amaranth.

EXAMPLE 2

The plasma-exposed semipermeable membrane prepared in the same manner as in Example 1 was put to reverse osmosis tests by using a saline water (sodium chloride concentration; 0.55%) at a temperature of 80° C. The results of the experiments were as follows.
Water flux: 6.5 gfd
Salt rejection: 93.8%

The results show that the polysulfone membrane in the present invention is sufficiently usable at a temperature as high as 80° C.

EXAMPLE 3

The plasma exposed semipermeable membrane prepared in the same manner as in Example 1 was put to reverse osmosis tests by using a saline water (sodium chloride concentration; 0.55%) within the pH range of 1 to 14 adjusted with hydrochloric acid or sodium hydroxide. The results of the experiments were as follows.

Experimental Conditions

Pressure: 50 kg/cm²
Temperature of saline water: 21° C.

| Experimental results | | |
| pH value | Water flux | Salt rejection |
| --- | --- | --- |
| 1 | 4.1 gfd | 95.8 % |
| 4 | 4.3 | 96.0 |
| 7 | 4.2 | 96.3 |
| 11 | 4.0 | 95.2 |
| 14 | 4.1 | 94.4 |

The results show that the plasma-exposed membrane of polysulfone has extremely excellent acid resistance and alkali resistance.

EXAMPLE 4

A polysulfone membrane without glow discharge treatment prepared under the same conditions as in Example 1 was exposed to a plasma generated by a corona discharge obtained by use of the power source of a corona-discharge-type surface treating equipment (made by Lapel) under a power input of 500 W (0.85 A). The exposure was conducted in the air of 1 atm. for 10 minutes. The exposed membrane was mounted on a continuous desalting apparatus and tested for saline water permeability under the same conditions as in Example 1.

Test Results

Water flux: 4.0 gfd
Salt rejection: 95.4%

What is claimed is:
1. A method for the production of semipermeable membranes, which comprises
exposing porous shaped articles of polysulfone having a form of film, sheet, tube or hollow fiber or being composite with another porous support and having pores of 100 to 1000 Å in size on the surface thereof, to plasma generated by glow discharge of a gas selected from the group consisting of helium, argon, nitrogen, oxygen, hydrogen, carbon monoxide, carbon dioxide, ammonia, and water under a pressure of 0.01 to 10 Torr to form a dense, crosslinked surface layer of no more than one micron in thickness.

2. A method according to claim 1 wherein said polysulfone has the following recurring units or mixture thereof:

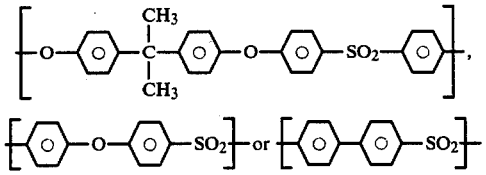

3. A method according to claim 1, wherein said glow discharge is generated by applying an alternating current or direct current voltage of 0.5 to 50 kV and wattage of 5 to 2500 watt.

4. A method according to claim 1 wherein the duration of exposure to plasma is 1 to 120 minutes.

5. A method according to claim 1 wherein said porous shaped articles are prepared by a casting process.

6. A semipermeable membrane prepared by the method of claim 1.

* * * * *